United States Patent

[11] 3,626,048

[72] Inventors Tohru Kitazawa
Osaka-shi;
Masao Onga, Kobe-shi, both of Japan
[21] Appl. No. 702,642
[22] Filed Feb. 2, 1968
[45] Patented Dec. 7, 1971
[73] Assignee Kanegafuchi Boseki Kabushiki Kaisha
Tokyo, Japan
[32] Priority Feb. 10, 1967
[33] Japan
[31] 42/8731

[54] METHOD FOR MANUFACTURING MOLDED ARTICLES OF POLYPIVALOLACTONE RESIN WHICH ARE SUPERIOR IN RIGIDITY AND TOUGHNESS
10 Claims, 3 Drawing Figs.

[52] U.S. Cl. .................................................... 264/176 R,
260/78.3 R, 264/235
[51] Int. Cl. .................................................... B29f 3/08

[50] Field of Search .......................................... 264/234,
235; 260/78.3

[56] References Cited
UNITED STATES PATENTS
3,476,714  11/1969  Hoegger .................... 260/78.3
3,299,171  1/1967  Knobloch et al. .............. 260/78.3
3,424,835  1/1969  Armour et al. ................ 264/210 F Primary Examiner—Robert F. White
Assistant Examiner—Gene Auville
Attorney—Woodhams, Blanchard and Flynn ABSTRACT: A method for manufacturing molded articles of polypivalolactone resin which have highly increased mechanical properties, especially in toughness, said cell comprising subjecting highly crystalline molded plastic articles of polypivalolactone resin having an intrinsic viscosity $[\eta]$ in the range of 1.5–4 to heat treatment under the treatment conditions consisting of temperature and duration which are both in ranges specified.

METHOD FOR MANUFACTURING MOLDED ARTICLES OF POLYPIVALOLACTONE RESIN WHICH ARE SUPERIOR IN RIGIDITY AND TOUGHNESS

BACKGROUND OF THE INVENTION

1. Field of the Invention

The present invention is concerned with a method for manufacturing molded articles of polypivalolactone resin which are of highly improved mechanical properties, especially in toughness. 2. Description of the prior art Polypivalolactone resin is of a crystallinity which is so high that the articles molded with polypivalolactone resin according to the injection molding techniques, compression molding techniques, extrusion molding techniques, blow molding techniques, or like molding techniques, are invariably superior especially in compressive strength and Rockwell hardness, of all the mechanical strengths. Also, these molded plastic articles are superior also in heat-resistivity and in the resistivity to chemicals, owing to the nature of polypivalolactone resin that it has a highly increased crystallinity. While molded articles of polypivalolactone resin may be considered suitable for use as industrial materials in view of the aforesaid desirable properties, it is important for those industrial materials of this type to be provided with both of the following principal properties of two categories which are: short term properties (which mean ordinary dynamic properties) and long term properties (which means dynamic properties which are displayed when deformed for an extended period of time or when loaded with a weight for an extended period of time). In other words, these industrial materials must be highly rigid as a whole body and at the same time they must have a highly increased toughness. This toughness can be evaluated from the impact resistance and also from the degree of elongation of the molded plastic articles, both of which serve as indices of toughness. With the foregoing in mind, various properties of the molded articles of polypivalolactone resin (not heat-treated) are compared with these of other molded plastic articles in the following table 1.

polypivalolactone resin, not having undergone subsequent heat treatment, are sufficiently high in rigidity but are rather poor in toughness. On the basis of the data contained in this table, molded articles of polypivalolactone resin can be termed briefly and adequately as being "rigid and brittle plastic articles."

In order to enhance the impact resistance of molded plastic articles in general, it is necessary to arrange so that the applied high impact energy is absorbed in some form or other. Theoretically, in the event that a certain high impact energy is applied to a molded plastic articles in general, this energy is immediately transmitted from one surface thereof through short paths to the reverse face of the molded plastic article, and the molded plastic article is eventually destroyed. Therefore, if the molded plastic article is constitutionally so arranged that this applied impact energy is effectively mitigated and dispersed within the internal structural system and also that the applied impact energy is transmitted through long paths to the reverse face, then the impact energy will be attenuated during its course of transmission so that the molded plastic articles eventually will gain an ability and force to resist the impact which has been applied thereto. As a means for reforming the internal fine structures of molded plastic articles which meets this purpose of enhancing their impact resistance, there have been practiced a method which involves the inclusion of an appropriate amount of soft rubberlike substance, such as polybutadiene, in the hard plastics and also a method which involves the step of copolymerizing the hard plastics and such a soft rubberlike substance.

Plastics other than polypivalolactone resin which have physical properties similar to those of the rigid and brittle polypivalolactone resin include, for example, polystyrene resin and polymethyl methacrylate resin.

In case polystyrene resin is used, there is a known successful method of enhancing both the rigidity and the impact resistance. This enhancement is effected by preparing a three-element copolymer of acrylonitrile-butadiene styrene. This

TABLE 1

| | Tensile strength (kg./cm.²) | Elongation (percent) | Compressive strength (kg./cm.²) | Hardness (Rockwell) | Impact resistance (of Izod notch) kg. cm./cm.² | Deformation 4.6 kg./cm.² | Temperature (° C.) 18.6 kg./cm.² |
|---|---|---|---|---|---|---|---|
| Polypivalolactone | 400–470 | 8–11 | 890–1,020 | M (80–97) | 4.9–5.0 | | 148–156 |
| Polyacetal | 600–700 | 26–65 | 1,000–1,100 | M 75–95 | 7.5–13.0 | 158 | 110 |
| ABS MHB | 510–530 | 4.3–10 | 800–820 | R 80–120 | 7.3–8.2 | 86 | 78 |
| Polycarbonate | 560–670 | 6–23 | 770 | M 60–70 | 50–70 | 135 | 125 |
| Nylon 6 | 650–840 | 25–70 | 470–880 | R–100–120 | 4–15 | 170 | 73 |
| Polypropylene | 300–420 | 200–700 | 590–700 | R 85–110 | 8.2 | 110 | 55 |
| Methyl polymethacrylate | 490–770 | 2–10 | 840–1,300 | M 85–105 | 1.2–3.1 | | 70–90 |
| Polystyrene | 350–630 | 1–2.5 | 800–1,100 | M 65–80 | 1.1–1.7 | | 70–90 |
| AS | 670–840 | 1.5–3.5 | 980–1,200 | M 80–90 | 1.5–2.1 | | 90–93 |
| ABS MT | 325–340 | 12–17 | 420 | R 80–120 | 22.6–31.0 | 75 | |
| High density polyethylene | 250–390 | 15–100 | 700 | D 60–70 | 6–30 | 60–85 | |
| Low density polyethylene | 130–200 | 90–650 | 300–500 | D 40–45 | Unbreakable | 40–50 | |
| Hard vinyl chloride | 350–600 | 2–4 | 550–900 | D 80–90 | 1.7–8.6 | | 50–75 |
| Soft vinyl chloride | 100–250 | 200–250 | 60–120 | | (¹) | | |

¹ Can vary with the plasticizer used.

In the above table 1, the tensile strength was measured on Dumbbell type test pieces at the pull rate of 10 mm./min. According to D–638, ASTM, using an almighty tester manufactured by K. K. Shimazu Seisakusho.

Compressive strength was measured according to D–785, ASTM on square bars for impact test of 1 × one-half × one-fourth inch in size.

Hardness was measured according to D–785, ASTM on square bars for impact test of 5 × one-half × one-fourth (inch) in size.

Impact resistance was measured, according to Izod method of test for impact resistance (D–256, ASTM), on square bar type test pieces prepared by injection molding process and having a mechanically produced V-shape notch of one-tenth inch in depth.

Heat resistance was evaluated and the result is expressed by the resistance to heat deformation, or in other words, it is indicated by the deformation temperature according to D–648, ASTM.

As will be noted clearly from table 1, molded articles of represents another example where a rubberlike component, which is mixed as the "polymer blend" in the copolymer, plays the role of a resistor to the applied impact energy under the principle as has been described above.

Also, in molded polypropylene resin articles, for example, it has been known to enhance the impact resistance of this molded plastic article by the admixture therein of a high pressure polyethylene or an ethylene-vinyl acetate copolymer.

For the purpose of improving the toughness of polypivalolactone resin, there was made an extensive research by us, on the degree of impact resistance which is imparted to this polypivalolactone resin by blending therewith, according to a known technological concept, various polymers such as polybutadiene, high pressure polyethylene, ethylene-vinyl acetate copolymer, oxidized polyethylene and ABS resin. However, the result was that these polymers which were blended in polypivalolactone resin were generally poor in their cosolubility with the latter, and therefore, no satisfactory effects were obtained in view of the high crystallinity of polypivalolactone resin.

Also, depending on the type of polymer blended, the molded polypivalolactone resin articles exhibited an enhanced impact resistance which, however, was accompanied by a substantial reduction in the desirable properties which are peculiar to polypivalolactone resin. Furthermore, a study was conducted by us, on the degree of impact resistance of molded articles of polypivalolactone resin which were produced by copolymerization of polypivalolactone resin and $\beta$-propiolactone homologues and which were not given subsequent heat treatment. The result was that there were obtained no sufficiently satisfactory molded plastic articles having both a high degree of rigidity and a high degree of toughness.

SUMMARY OF THE INVENTION

It is, therefore, the object of the present invention to provide molded articles of polypivalolactone resin which are less brittle and which are of highly increased toughness.

In order to solve the foregoing problems of molded articles of polypivalolactone resin of the prior art, a basic study of the physical properties as well as the structure of polypivalolactone resin was conducted again and also an extensive research on the relationship between the molding conditions and the fine structure of the molded articles was conducted by us. It was found from this study and research that the impact resistance and the tensile elongation of the molded plastic articles could be markedly improved simply by subjecting the molded articles of a single-component polypivalolactone resin to heat treatment under specific treatment conditions, without the need of blending the polypivalolactone resin with any other polymers and without resorting the process of subjecting the polypivalolactone resin to copolymerization with any other polymers.

Hereunder are given the results obtained from subjecting molded articles of polypivalolactone resin shown in table 1 to dry heat treatment at 200° C. for 1.5 hours.

TABLE 2

|  | No heat treatment | Heat-treated |
| --- | --- | --- |
| Tensile strength (kg./cm.$^2$) | 400–470 | 390–450 |
| Elongation (%) | 8.0–11.0 | 40–60 |
| Compressive strength (kg./cm.$^2$) | 890–1020 | 890–1100 |
| Hardness (Rockwell) | M 80–97 | M 77–85 |
| Impact resistance (kg.cm./cm.$^2$) | 4.9–5.0 | 9–12 |

It will be clearly understood from table 2 that molded articles of polypivalolactone resin which have undergone a heat treatment exhibit a marked improvement in their toughness, or in other words, a marked improvement in both the impact resistance and elongation which are the object of the present invention. Although this improvement in toughness and the increase in elongation are accompanied by a slight reduction in the tensile strength and the hardness of the molded plastics, such reduction practically is negligible and should cause no problem whatsoever in the physical as well as the chemical properties of the molded plastics.

It was noted from the research that molded articles of polypivalolactone resin which did not undergo a heat treatment showed a deformation temperature which was in the range of 148°–156° C., and that those molded plastics which did undergo a heat-treatment showed deformation temperatures above this range. Since polyethylene glycol, which was the heat medium used in the measurement in the aforesaid study and research was such that it could not be used at a temperature above 160° C., no precise values were obtained. In view of the fact, however, that the amount of the deformation of the heat-treated molded articles did not mark 0.01 inch even when they were subjected to the temperature of 160° C., it can be safely said that the deformation temperature of the molded articles of polypivalolactone resin which have undergone heat treatment would never be less than that of those molded articles of polypivalolactone resin which have not undergone heat treatment.

Molded articles of polypivalolactone resin having undergone heat treatment also showed extremely satisfactory results in the impact fatigue test, and this satisfactory resistance to impact fatigue constitutes one of the important properties of molded plastic materials intended for use industrially. More specifically, molded articles of polypivalolactone resin not having undergone heat treatment are brittle and are easily broken. According to the experiment conducted by us, those molded plastic articles which have been given a heat treatment showed an impact fatigue resistance which was improved to about 100 times that of untreated molded plastics. As will be noted from the aforesaid finding, the improvement in the toughness of molded articles of polypivalolactone resin which is effected from subjecting such molded plastic articles to heat treatment is something which is so outstanding that it is not consistent with the widely accepted conception of thermal behavior of ordinary polymers. That is to say, according to the accepted idea, highly crystalline polymers, when subjected to a heat treatment, would rather exhibit reduced impact resistance and elongation. For this reason, the aforesaid marked effect or the marked improvement in toughness which is acquired by molded articles of polypivalolactone resin when subjected to a heat treatment is something which should be termed as being really an unexpected and surprising phenomenon.

The aforesaid fact will be easily understood by comparing the thermal properties of, for example, molded articles of polyacetal resin—which represent a typical industrial material of this kind as described previously—with the thermal properties of molded articles of polypivalolactone resin.

The following description will refer to Celcon resin, a product of Celanese Corporation of America, as a typical polyacetal resin. It is reported that the molded articles of Celcon resin, when subjected to a heat treatment at 116° C. for a period up to 2000 hours, do not exhibit any appreciable change in the tensile impact strength or Izod impact resistance, whereas the tensile strength of the molded plastic articles increases with the duration of the heat treatment given. The molded plastic articles of this type have a melting point (herein it means the temperature at which the crystals are melted) of 165° C. and a flow temperature of 174° C. The temperature at which deformation of the molded plastic articles takes place at the end of 30 minutes of being left in quietude without being loaded with a weight, or in other words, the deformation temperature of this molded plastic articles, is in the range of 149°–160° C. The aforesaid various kinds of temperatures of molded articles of polyacetal resin lie in ranges which are all considerably lower than the ranges of corresponding temperatures of molded articles of polypivalolactone resin.

Furthermore, in case it is intended to increase the dimensional stability of those molded plastic articles which require precision in various respects among all industrial materials, this stabilization has been often effected by subjecting the molded plastic articles to heat treatment. Such a stabilizing treatment which was given molded plastic articles of the prior art has been intended for the removal of the residual strains of the internal structure of the molded plastic articles, and the molded plastic articles have been given this stabilizing treatment only to prevent the occurrence of the so-called stress-cracks which were caused either by the mechanical forces applied to or by the solvents used, or to enhance the dimensional stability by eliminating warping of the molded plastic articles. Therefore, such changes in the physical properties resulting from the heat treatment as are seen in the molded articles of polypivalolactone resin of the present invention are something which is really amazing and are completely unforeseen effects which are due to the substantial and drastic reformation of the internal fine structure of the molded plastic articles. In connection with the heat treatment of this polymer, there has been described in the Japanese Pat. Publication No. 9810/1966 a method for improving the work recoverability and the tension recoverability of polypivalolactone fibers by subjecting the latter to a heat treatment. The invention described in said publication relates to a polypivalolactone fiber and a manufacturing method therefor, which is intended fur use in carpets, pillows, sleeping bags, sheets, cushions, stuffing materials, reinforcing materials and so forth and wherein the numerical values to be assumed by the specific basic structural elements (which are molecular weight, degree of orientation, $\alpha$-ratio, apparent width of the $\alpha$-crystallite and radical breadth of the crystallite) of the fiber are defined.

The present invention is completely different from that described in said publication in the object of manufacture, use, state and structure of the products. Besides, the present invention does not satisfy the basic structural elements defined in said publication, and this is very clearly demonstrated when, for example, the method for manufacturing the molded plastic articles of the present invention is compared with the method of manufacturing said fibers, or when, for example, the degree of orientation due to the difference in the manufacturing method is taken into account. Furthermore, the mere comparison of both the structure and the values of the imparted physical properties of the fiber described in said publication with the structure and the values of the physical properties of the molded plastic articles of the present invention will readily demonstrate the differences between the present invention and the invention described in said publication.

The relationship between the internal structure which constitutes the tough molded articles of polypivalolactone resin of the present invention and the physical properties thereof will hereunder be briefly discussed. Assuming, in general, that the attractive force exerted between the chain molecules represents a "combination" of molecules in its broad sense, this polymer consists of a sort of network which is formed by molecules having various different degrees of attractive force.

By subjecting this molded plastic to heat treatment, there are formed and also there will be a growth of firm molecular combinations which are more securely united to each other of all the molecular combinations constituting the molded plastic article, and at the same time, there are formed relatively soft portions in the molded plastic where the segmental motion of molecular chains located between the aforesaid combinations can take place with relative freedom. The toughness which is imparted to the molded articles of polypivalolactone resin in accordance with the present invention is based on such relatively obvious two-phase structure of the polymer which results from the heat treatment. It has been elucidated by us, that the changes which occur in the physical properties of the molded plastic articles of the present invention due to heat-treatment are closely related to, especially, the amorphous areas which are represented by the aforesaid latter soft portions.

It should be understood further that, in view of the object of the present invention being to achieve improvement of the toughness, which may be more specifically termed as being the impact resistance and the tensile elongability, of the molded plastic articles which may be produced according to various molding techniques such as injection molding, compression molding, blow molding and extrusion molding, the ranges of heat treatment conditions which are applied to the molded plastic articles of the present invention differ naturally and essentially from the ranges which are applied to the fiber described in the aforesaid publication.

The following description will next be directed to the details of the result of the research undertaken by us, on the correlation between the molding conditions, the heat treatment conditions—both of which are associated with the manufacture of the molded plastics—and the properties of the molded plastics as the final products.

In the research of the molding conditions applicable to, for example, injection molding, we, measured the various properties of the molded plastics under various combinations of molding conditions which range widely in such a way that the injection pressure ranges from 300 kg./cm.$^2$ to 1100 kg./cm.$^2$, the metal mold temperature ranges from 20° to 180° C., the cylinder temperature ranges from 245° to 320° C. and the cycle ranges from 20 seconds to 3 minutes (20 seconds to 3 minutes for dumbbell test pieces and 30 seconds to 3 minutes for square bars for impact test). Furthermore, various properties of the molded plastics which are acquired after heat treatment were observed by subjecting the molded plastic articles to heat treatment at temperatures ranging from 100° to 230° C. for periods of time lasting up to 10 hours.

Description will be made first on the molded plastic articles which have not been given heat treatment.

Optimum injection pressure varies with the molecular weight of the polymers used. Intrinsic viscosity $[\eta]$ was employed to serve as the measure for differentiating the molecular weights. This $[\eta]$ was determined on a mixed solvent consisting of six parts by weight of phenol and four parts by weight of orthochlorophenol and held at 30° C. As the result of the aforesaid molding experiment, it was found that the appropriate range of moldability was in the range of 400 to 900 kg./cm.$^2$ (molding pressure) for plastics having an $[\eta]$ of 2.0 or less; 600 to 1000 kg./cm.$^2$ for plastics having an $[\eta]$ of 2.0–3.0; and 800 to 1100 kg./cm.$^2$ for plastics having an $[\eta]$ of three or more. The range of $[\eta]$ which is appropriate for injection molding was 1.5 to 4, preferably 2 to 3.5. It was noted from the experiment conducted by us, that, in case the injection pressure was exceedingly great, there could occur cracks in the molded plastic articles, whereas in case the injection pressure was extremely small, there would occur lack of filling of the plastic in the metal mold, and as a result, it often happened that no satisfactory molded plastic articles were obtained in each of these instances. The metal mold temperature did not have a marked effect on the properties of the molded plastic articles, and therefore, the appropriate range of this temperature can be selected as desired. In practice, however, the selection of the metal mold temperature ought to be decided in association with the conditions of the subsequent heat treatment. While the relationship between the metal mold temperature and the heat-treatment temperature will be discussed later, it may be said that such selection can be done as desired depending on the internal structure of the molded plastic article which is determined from the aspect of the use of the molded plastic articles. Speaking generally with respect only to the metal mold temperature itself, it can be said that higher moldability is obtained from lower metal mold temperature, whereas the properties of the final molded plastic article increases with an increase in the metal mold temperature.

The cylinder temperature was such that satisfactory moldability as well as satisfactory properties of the molded plastic articles were obtained from temperatures in the range of from 250° to 290° C.

The relationship between various molding conditions and the degree of their individual influence on the ability of the molded plastic articles which have not been given a heat treatment was studied. It was found that the most influential factor of all the molding conditions was the injection pressure, and that the metal mold temperature came next.

With respect to the cylinder temperature, no marked effect on the properties of the molded plastic article was observed. The degree of influence which is exerted by the cylinder temperature on molded polypivalolactone articles should differ somewhat from that which is exerted on ordinary polymers, but such a difference can be explained by the excellent flow property of the polypivalolactone resins. Judging from the increased properties of the molded plastic article having undergone a heat treatment, the metal mold temperature has as overwhelming influence on the properties of the molded plastic article. The lowest heat-treatment temperature (T)

which is required for imparting toughness to the molded plastic articles and the metal mold temperature (Tm) at the time of the injection molding are related to each other in such a way as is indicated by the following equation (1):

$$T = -0.08Tm + 142 \qquad (1)$$

In other words, the effect of the heat treatment develops at a temperature of about 140° C. at the lowest where the metal mold temperature is 30° C., and at a temperature of about 130° C. at the lowest where the metal mold temperature is 150° C.

The degree of the effect of the heat treatment depends also on the metal mold temperature, and greater effect is exhibited by those molded plastics which have been produced according to the injection molding techniques at higher metal mold temperatures. In the event, however, that a molded plastic article not heat-treated yet was subjected to a heat treatment at, for example, 180° C. for 1 hour, the impact resistance of this treated molded plastic at $Tm=30°$ C. was 4,48 kg.cm./cm.$^2$ (in contrast to 3.80 kg.cm./cm.$^2$ of the molded plastic article not heat-treated); at $Tm=80°$ C., it was 5.46 kg.cm./cm.$^2$ (as against 4.20 kg.cm/cm.$^2$ of the molded plastic article not heat-treated); and at $Tm=150°$ C., it was 8.66 kg.cm./cm.$^2$ (in contrast to 4.90 kg.cm./cm.$^2$ of the molded plastic article not heat-treated).

Ordinarily, the preferred metal mold temperature is lower than the deformation temperature of the polymer used. Accordingly, the preferred metal mold temperature for molding polypivalolactone resin is 160° C. or lower. While the dimensional stability of the molded articles of polypivalolactone resin increases with an increase in the temperature of the metal mold used, high metal mold temperatures not only brings forth a loss of economy due to the prolonged cycle, but also is economically disadvantageous from such point of view as the cost of electric heating. On the other hand, however, lower metal mold temperatures will result in a reduced properties of the molded plastic articles as compared with the properties resulting from high metal mold temperatures. Furthermore, different effects are produced on the properties of the molded plastic articles from different heat treatment conditions. With respect to the aforesaid test pieces of the molded article of polypivalolactone resin, a maximum effect of the heat-treatment on these test pieces was noted when the heat treatment temperature was 200° C., at which occasion the impact resistance showed a value which was 10.4 kg.cm./cm.$^2$. As has been described above, the impact resistance of molded articles of polypivalolactone resin increases with an increase in the heat treatment temperature up to 200° C. With this 200° C. being the peak, the impact resistance of the molded plastics drops when the latter are subjected to heat treatment at temperatures above this level. This drop in the impact resistance noted from heat treatment conducted at temperatures above 200° C. is considered to be due to the participation of thermal degradation of the polymers used. More specifically, when a molded article of polypivalolactone resin is subjected to a heat treatment at a temperature above 200° C., at, for example 210° C. or 220° C., there will be noted coloring of the molded plastic article even from a heat treatment lasting for a short period of time. The degree of the effect, due to the heat treatment time lasting in excess of 1 hour, on the properties of the molded plastic article, is not markedly great as compared with the effect caused by the heat treatment temperature. However, the degree of reduction in the properties of the molded plastic article when the latter is subjected to heat treatment at a temperature above 200° C.—at which time thermal degradation is considered to associate with this reduction in the properties increases to a considerable extent in proportion to the length of the heat treatment given.

Similar effects from heat treatment as those exerted on the aforesaid impact resistance also occur on the tensile elongation of the molded plastic articles. In contrast to the elongation of the molded plastic articles which have not been given a heat treatment i.e 9 percent, the elongation of those molded plastic articles which are subjected to a heat treatment at about 210° C. will increase up to the maximum of 60 percent. In other words, in case a molded plastic article is subjected to a heat treatment, its impact resistance increases twice as much or more of the level observed before such heat treatment was given, while the elongation of the molded plastic article improves five times as much or more of the value noted prior to such heat treatment.

The uppermost limit of the heat treatment temperature is 230° C. Temperatures beyond that level are consistent with the softening range of the molded plastic articles, and cause an even further reduction in the properties of the molded plastic articles beyond the level of the properties noted on the molded plastic articles which are not heat-treated. It is added here that the melting point of the molded articles of a single-component polypivalolactone resin is 238° C.

In general, the optimum result is obtained from heat treatment which is conducted within a temperature range of 180°–200° C. With respect to the duration of heat treatment, it should, of course, vary depending on the temperature employed. Broadly speaking, however, a heat treatment lasting not longer than 6 hours will insure satisfactory operation without the fear for the occurrence of coloring in the molded plastic articles.

While no strict minimum length of heat treatment can be set forth, there are instances where both the impact resistance and the elongation show an improvement due to a heat treatment lasting for only 2 to 3 minutes. However, a heat treatment time lasting 30 minutes or more is preferred, in which case a very marked desirable effect is insured.

The heat medium which is employed in the heat treatment of the present invention is not restricted specifically. So long as it is an inactive heat medium which does not directly react chemically with polypivalolactone resin, any desired heat medium such as heated air, hot water, heated aqueous vapor, Wood's alloys and oily materials, can be used.

Description has been made in detail on the correlation between the molding conditions, the heat treatment conditions and the properties of the molded plastic articles of the type produced according to the injection molding techniques. This correlation essentially holds true for those molded plastic articles produced by the molding techniques other than said injection molding techniques. Hereunder will be described those points which constitute problems in the molding of plastics which is effected according to the molding techniques other than the injection molding techniques.

In the case of extrusion molding, its workability is, in general, better with plastics having greater molecular weight. Since this extrusion molding requires a somewhat high back pressure and also uniform melting of the plastic to be extruded, the extruding apparatus per se is required to be such that can satisfy very severe mechanical conditions as compared to the apparatuses used in other molding techniques. In view of the fact that the melt-viscosity of polypivalolactone resin, or in other words, its flow property when melted, depends greatly on both the temperature and the pressure applied to as compared with other ordinary polymers, the workability of molding of this resin is better than with other plastics. In extrusion molding, technological caution should be directed to the following points: the rate of pulling which is applied to the polypivalolactone resin after it has been discharged from the die; the distance between the die and the chilled rollers; and the balance between the temperature of the pulling rollers and the extrusion pressure. It should be noted further that the employment of a temperature above 280° C. would often cause coloring and decomposition of the polymer, so that it is important to place the temperature under particularly severe control. These technological elements will constitute important factors which determine the value, as a commodity, of the molded plastic product which may be, for example, a sheet, the quality of which will be evaluated by, for example, the evenness or unevenness of the width and the thickness of the sheet; the absence or the presence of bubbles in the sheet; transparency or coloring of the sheet; and the quality of the finish of the faces of the sheet.

While individual molding conditions have to be selected adequately for each extrusion molding by taking into account the molecular weight of the polypivalolactone resin used, the specification of the molding apparatus and the purpose for which the product is used, there are the general molding conditions which are applied, in common, to all instances of extrusion molding. These conditions are as follows. First, with respect to the temperatures employed in the cylinder barrel section, there are the following ranges. Hopper section: 220°–250° C., Cylinder: 260°–280° C., Adapter: 260°–280° C., and Die: 250°–270° C., are preferred. Generally speaking, it is advantageous to carry out extrusion-molding of polypivalolactone resin in such a way that temperatures on the higher side within the aforesaid ranges be applied to polymers having a relatively high molecular weight, whereas temperatures on the lower side within said limits be employed for the polymers having a relatively low molecular weight.

The molded plastic articles thus produced are reformed into molded plastic articles having improved toughness by being subjected to a heat treatment which is conducted in a manner similar to that described in connection with the molded plastic products obtained according to the injection molding techniques.

Description will next be directed to the products obtained according to the compression molding techniques. The degree of the initial compression which is applied to the polymer in the stage immediately after the latter has been melted preferably is such that it is sufficient for only lightly pressing the metal mold against the contents so as to make the polymer to generally conform to the shape of the metal mold. With respect to the subsequent step of compression which is carried out in a cold press, it should be noted that a satisfactory molded plastic article can be obtained by the application of a relatively high pressure to the metal mold and accordingly to the polymer contained therein while effectively utilizing the softening range of the polymer during the course of the cooling process. An important aspect of the compression molding lies in the manner in which the aforesaid latter steps are performed, or in other words, a successful compression molding is accomplished depending on the manner in which a pressure is applied to the cold press. Attention should be paid to the fact that polypivalolactone resin is of a high crystallinity and also that its softening range is narrow.

Description will next be directed to the molded plastic articles produced by the blow molding techniques. This blow molding is not particularly difficult technologically as compared with other molding techniques. Since the strain recovery of polypivalolactone resin at the point immediately after it is discharged from the die is rather intensive, there is no need of particularly taking the clearance of the die into account. Rather than that, attention should be paid to the high crystallinity of polypivalolactone resin. The exercise of this attention is necessary especially in the molding of molded plastic articles having a considerable thickness.

Molded plastic articles obtained according to the compression molding techniques and the blow molding techniques are also reformed into molded plastic articles which are satisfactorily rigid and tough and which have markedly improved impact resistance, elongation and fatigue resistance by subjecting the molded plastic articles to a heat treatment in a manner similar to that described above in connection with the molded plastic articles obtained by other molding techniques.

As has been stated above, we have succeeded in manufacturing rigid and tough molded plastic articles without any appreciable loss of various mechanical properties which are possessed by polypivalolactone resin, based on the finding that molded articles of polypivalolactone resin are reformed, by being subjected to heat treatment, into useful industrial materials.

In actual heat treatment, it is necessary to set forth heat treatment conditions so as to adequately meet the history of the molding conditions under which the plastics have been molded. It is to be noted, however, that irrespective of the conditions under which plastics are molded, it is possible to manufacture molded articles of polypivalolactone resin which are highly rigid and tough, by performing the heat treatment within the range of conditions which will hereunder be defined.

BRIEF DESCRIPTION OF THE DRAWING

FIG. 2 indicates the Range B which represents appropriate conditions of the heat treatment; and FIG. 3 indicates the Range C which represents further desirable conditions of the heat treatment.

Figure 1:
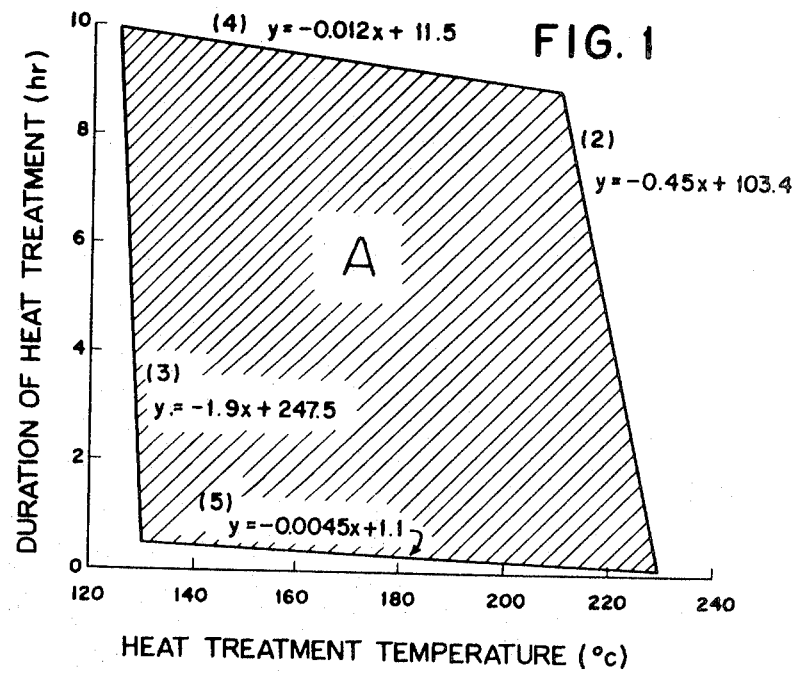
FIGS. 1, 2 and 3 are diagrams defining the optimum range of the heat treatment conditions which are applied to in carrying out the heat treatment of molded articles of polypivalolactone resin according to the method of the present invention, wherein FIG. 1 indicates the Range A which represents the necessary minimum conditions of the heat treatment.

By summarizing the aforesaid result of the research undertaken by us, the treatment conditions according to the method of the present invention are strictly defined as follows. That is to say, the heat treatment is performed by selecting the temperatures and the heat treatment time (meaning the duration of the heat treatment) so that both lie within the Range A of FIG. 1, i.e. the area of oblique lines surrounded by the rectilinear lines which are indicated by the equation (2), (3), (4) and (5) which are as given below:

$$y=-0.45x+103.4 \quad (2)$$
$$y=-1.9x+247.5 \quad (3)$$
$$y=-0.012x+11.5 \quad (4)$$
$$y=-0.0045x+1.1 \quad (5)$$

wherein:

$x$ represents the heat treatment temperature (° C.); and $y$ represents the duration of the heat treatment (hr.)

It is to be noted that the equation (3) and the equation (5) both represent the minimum treatment conditions which are necessary for imparting toughness to the molded plastic articles, wherein the former or the equation (3) defines mainly the heat treatment temperature, while the latter or the equation (5) defines the duration of the heat treatment. Also, the equation (2) and the equation (4) indicate the boundaries of the heat treatment conditions beyond which it is either actually difficult to perform the treatment or undesirable from the aspect of workability of the operation and/or the aspect of properties of the final products.

Figure 2:
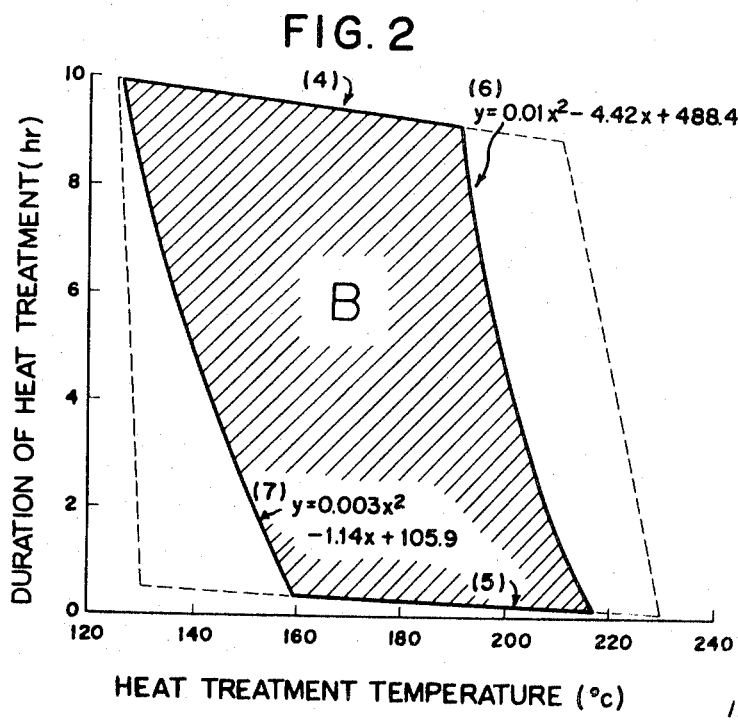

In order to obtain excellent molded plastic articles, however, it is desirable to select the heat treatment conditions so that they lie within the Range B of FIG. 2, i.e. the area of the oblique lines surrounded by the curves which are indicated by the equations (4), (5), (6) and (7), respectively, wherein the latter two equations are given as follows:

$$y=0.01x^2-4.42x+488.4 \quad (6)$$
$$y=0.003x^2-1.14x+105.9 \quad (7)$$

Figure 3:
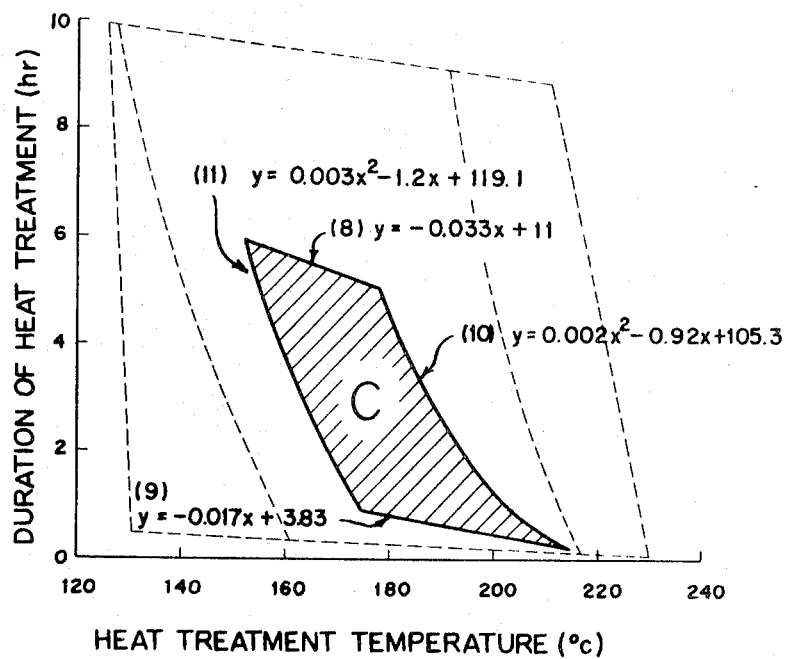

It is further desirable to perform the heat treatment by selecting the heat treatment conditions so as to fall within the Range C of FIG. 3, namely, the area of the oblique lines surrounded by the curves which are indicated by the undermentioned equations (8), (9), (10) and (11):

$$y=-0.033x+11 \quad (8)$$
$$y=-0.0147x+3.83 \quad (9)$$
$$y=0.002x^2-0.92x+105.3 \quad (10)$$
$$y=0.003x^2-1.2x+119.1 \quad (11)$$

By doing so, it becomes possible to manufacture molded plastic articles which are extremely good in both rigidity and toughness.

It is to be noted that equation (6) and equation (7) represent limitation curves, respectively, which are the necessary and sufficient conditions for the manufacture of excellent molded plastic articles. Whereas, equation (8), equation (9), equation (10) and equation (11) represent limitation curves, respectively, within which even the molded single-component plastic articles consisting of only polypivalolactone resin and containing no additive such as heat stabilizer can be easily reformed into molded plastic articles which are equipped with sufficiently good properties. In case, however, the heat treatment is conducted under conditions lying outside the curve which is indicated by the equation (10), there can be instances where coloring of the molded plastic articles occur at the time of the heat treatment.

In the appended examples of the present invention are given detailed description of the significance of the aforesaid ranges of the heat treatment conditions.

Polypivalolactone resin which is used in the method of the present invention means a linear condensation polymer consisting substantially of recurring ester structure unites of the formula:

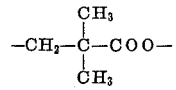

and can be manufactured easily according to the method of polymerizing hydroxypivalic acid or its esters as is described in the specification of U.S. Pat. No. 2,658,055 or by the employment of the method of polymerizing pivalolactone as is described in the specification of the British Pat. No. 766,374. Besides these polypivalolactone resins described in these patents, copolymers which are prepared by subjecting such a polypivalolactone resin as is described in these patents to copolymerization with up to 25 percent by mol of other lactones such as $\beta$-propiolactone, $\alpha$, $\alpha$-diethylpropiolactone are also conveniently usable. Furthermore, mixtures prepared by blending such a polypivalolactone as has been described in said patents with other polymers which substantially do not affect the desirable inherent properties of the polypivalolactone resins are also suitable for the method of the present invention. It is needless to say that polypivalolactone resins containing ordinary additives such as dyestuffs, pigments and stabilizers can be used also in the present invention.

The method of the present invention can be applied to molded plastic articles, molded plastic sheets, films, guts, filaments and like molded plastic products which are obtained according to the known molding techniques such as extrusion molding, injection molding, compression molding and blow molding.

DESCRIPTION OF THE PREFERRED EMBODIMENTS

EXAMPLE 1

Using polypivalolactone resin having an intrinsic viscosity [$\eta$] of 2.88 and by the use of a vertical type injection molding apparatus manufactured by Yamashiro Seiki K. K., both dumbbell type and square-bar-type test pieces were prepared.

Molding of these test pieces were performed under the molding conditions which were the combinations of the following selected individual conditions which were: cylinder temperatures of 250° C., 270° C., 290° C., 310° C. and 320° C., respectively; metal mold temperatures of 20° C., 30° C., 80° C., 150° C. and 180° C., respectively; and injection pressure of 300, 400, 600, 800, 1100 and 1200 kg./cm.$^2$, respectively. The properties of each molded plastic article was measured.

The relationship between the molding conditions and the properties of the molded plastic articles is given in the following table 3.

The molded plastic articles thus obtained were then subjected to dry heat treatment utilizing hot air held at 200° C. for 1.3 hours. The altered physical properties of the molded plastic articles after the heat treatment, are enumerated in the table 4 given below.

The method of measurement and the condition therefor for each item of measurements was pursuant to those described previously in the earlier part of this specification.

TABLE 3.—MOLDING CONDITIONS AND PROPERTIES OF MOLDED PLASTIC ARTICLES

| Test piece No.: | Cylinder temp. (° C.) | Metal mold temp. (° C.) | Injection pressure (kg./cm.$^2$) | Tensile strength (kg./cm.$^2$) | Elongation (percent) | Compressive strength (kg./cm$^2$) | Hardness (Rockwell) | Impact resistance (kg.cm./cm.$^2$) |
|---|---|---|---|---|---|---|---|---|
| 1 | 245 | 150 | 1100 | Poor molding | | | | |
| 2 | 250 | 20 | 1200 | Cracks developed in molded plastic | | | | |
| 3 | 250 | 20 | 1100 | 400 | 11.0 | 850 | 85 | 3.7 |
| 4 | 250 | 20 | 600 | 360 | 11.0 | 720 | 80 | 3.7 |
| 5 | 250 | 30 | 800 | 400 | 8.0 | 840 | 86 | 3.8 |
| 6 | 250 | 30 | 600 | 370 | 11.0 | 720 | 82 | 3.7 |
| 7 | 250 | 80 | 800 | 415 | 8.4 | 870 | 88 | 4.2 |
| 8 | 250 | 80 | 600 | 390 | 11.0 | 770 | 83 | 3.7 |
| 9 | 250 | 150 | 800 | 450 | 9.3 | 900 | 86 | 4.9 |
| 10 | 250 | 150 | 600 | 430 | 11.0 | 870 | 82 | 3.7 |
| 11 | 250 | 180 | 800 | 470 | 9.6 | 1020 | 90 | 5.1 |
| 12 | 250 | 180 | 600 | 450 | 11.0 | 950 | 85 | 3.7 |
| 13 | 250 | 180 | 400 | 400 | 11.0 | 900 | 85 | 3.1 |
| 14 | 250 | 180 | 300 | Lack of filling | | | | |
| 15 | 270 | 30 | 800 | 400 | 8.0 | 900 | 85 | 4.2 |
| 16 | 270 | 30 | 400 | 380 | 9.0 | 720 | 80 | 4.0 |
| 17 | 270 | 80 | 800 | 415 | 8.1 | 910 | 85 | 4.4 |
| 18 | 270 | 150 | 800 | 445 | 9.0 | 930 | 87 | 4.8 |
| 19 | 270 | 150 | 300 | Lack of filling | | | | |
| 20 | 290 | 80 | 800 | 410 | 9.0 | 850 | 86 | 4.3 |
| 21 | 290 | 150 | 800 | 450 | 10.0 | 900 | 86 | 4.8 |
| 22 | 290 | 150 | 300 | Lack of filling | | | | |
| 23 | 310 | 150 | 800 | 435 | 9.0 | 850 | 85 | 4.8 |
| 24 | 310 | 150 | 300 | Lack of filling | | | | |
| 25 | 320 | 150 | 800 | Unmoldable due to intensive thermal decomposition | | | | |

TABLE 4.—PROPERTIES OF MOLDED PLASTIC ARTICLES AFTER HEAT TREATMENT (200° C. for 1.3 hours)

| Test piece No.: | Tensile strength (kg./cm.$^2$) | Elongation (percent) | Compressive strength (kg./cm.$^2$) | Hardness (Rockwell M) | Impact resistance (kg.cm./cm.$^2$) |
|---|---|---|---|---|---|
| 3 | 380 | 40 | 890 | 85 | 9.2 |
| 4 | 340 | 40 | 870 | 85 | 9.0 |
| 5 | 380 | 45 | 900 | 84 | 9.5 |
| 6 | 350 | 45 | 880 | 80 | 9.3 |
| 7 | 400 | 50 | 930 | 85 | 10.2 |
| 8 | 370 | 52 | 910 | 80 | 9.7 |
| 9 | 430 | 68 | 1000 | 84 | 11.1 |
| 10 | 410 | 70 | 970 | 80 | 10.8 |
| 11 | 450 | 60 | 1100 | 85 | 12.0 |
| 12 | 430 | 60 | 1050 | 82 | 11.9 |
| 13 | 370 | 60 | 1050 | 80 | 11.5 |
| 15 | 380 | 40 | 900 | 84 | 9.4 |
| 16 | 340 | 40 | 870 | 80 | 9.3 |
| 17 | 410 | 43 | 930 | 85 | 10.0 |
| 18 | 450 | 60 | 1050 | 84 | 11.1 |
| 20 | 420 | 45 | 930 | 83 | 9.8 |
| 21 | 450 | 50 | 1050 | 82 | 9.8 |
| 23 | 400 | 45 | 1030 | 80 | 9.5 |

In table 3, the molded plastic article of test piece No. 1 bore the formation of several rows of linear marking which spoiled the external appearance, and besides, it had no luster at all.

The imparting of toughness to the molded plastic articles which is the object of the present invention was not accomplished on these test pieces even by varying the molding conditions in many ways. Only slight improvement in tensile strength and rigidity was noted where greater injection pressure was applied to and where higher metal mold temperature was employed. No obvious trend was noted in regard to elongation. However, in some instances, there were seen rather reverse behavior of elongation relative to rigidity where high injection pressure was applied to.

As shown in table 4, by subjecting these molded plastic articles to a heat treatment, there is obtained an extremely marked improvement in toughness, and as a result, the resulting molded plastic articles can be used as materials which are useful for industrial purposes.

EXAMPLE 2

Using a polypivalolactone resin having an intrinsic viscosity [$\eta$] of 3.0, molded plastic articles were prepared under the molding conditions consisting of a metal mold temperature of 150° C., a cylinder temperature of 250° C., an injection pressure of 800 kg./cm.$^2$. and a cycle of 1 minute for dumbbell test pieces and 2 minutes for square bars.

Description will hereunder be directed to the details of the various effects obtained from subjecting these test pieces to heat treatment under the respective treatment conditions lying within the ranges of A, B and C which have been described in the earlier part of this specification and also under treatment conditions outside these respective ranges. Table 5 given below contains the respective treatment conditions of the heat treatment given and their corresponding ranges.

Also, gross observations were made on the development of coloring by which the value of the molded plastic articles as commodity is evaluated in general.

The conditions of the heat treatment defined according to the present invention have been determined by taking into account those elements which are associated with the physical properties, external appearance and coloring of the molded plastic articles, and those elements related to the molding workability, and further those concerning economy. As has been stated in detail in the earlier part of this specification, the effect of imparting toughness is brought about by the adoption of the treatment conditions lying within the Range A. Desirably, by performing a heat treatment under the conditions lying within the Range B, and further desirably, by carrying out the treatment under the conditions lying within the Range C, it becomes possible to produce molded plastic articles having a highly increased commodity value.

EXAMPLE 3

Molded plastics were prepared with a polypivalolactone resin having an [$\eta$]=2.6 and under molding conditions consisting of a cylinder temperature of 250° C., an injection pressure of 800 kg./cm.$^2$, a metal mold temperature of 150° C. and a cycle of 1 minute for dumbbell type test pieces and 2 minutes for square-bar-type test pieces. By altering the heat treatment temperature and the duration of the heat treatment in various ways, the effect of the heat treatment on the test pieces was evaluated. In this example, measurement was taken on the effect of the heat treatment, i.e., the toughness, especially in regard to impact resistance and elongation which are shown in table 6.

TABLE 6.—RELATIONSHIP BETWEEN HEAT TREATMENT CONDITIONS AND TOUGHNESS

| Test piece No. | Heat treatment conditions | | Impact resistance (kg.cm./cm.$^2$) | Elongation (percent) |
|---|---|---|---|---|
| | Temp. (° C.) | Duration (hr.) | | |
| 1 | Not heat-treated | | 4.9 | 9.3 |
| 2 | 100 | 0.05 | 4.9 | 9.3 |
| 3 | 100 | 10 | 4.7 | 9.2 |
| 4 | 130 | 0.05 | 4.8 | 9.3 |
| 5 | 130 | 0.5 | 5.1 | 10.3 |
| 6 | 130 | 1 | 5.3 | 12.0 |
| 7 | 150 | 1 | 6.8 | 18.3 |
| 8 | 150 | 7 | 7.3 | 20.1 |
| 9 | 200 | 1 | 10.9 | 55.0 |
| 10 | 200 | 7 | 12.0 | 60.0 |
| 11 | 220 | 1 | 10.1 | 48.0 |
| 12 | 220 | 7 | 8.0 | 35.0 |
| 13 | 230 | 0.03 | 4.7 | 9.2 |
| 14 | 230 | 0.05 | 5.1 | 10.0 |
| 15 | 230 | 1 | 7.0 | 20.0 |

TABLE 5.—THE DEFINED RANGES OF HEAT TREATMENT CONDITIONS AND THE PROPERTIES OF MOLDED PLASTIC ARTICLES HAVING UNDERGONE HEAT TREATMENT

| Conditions of heat treatment | | | Tensile strength (kg./cm.$^2$) | Elongation (percent) | Compressive strength (kg./cm.$^2$) | Hardness (Rockwell M) | Impact resistance (kg. cm./cm.$^2$) | Coloring |
|---|---|---|---|---|---|---|---|---|
| Temp. (° C.) | Duration (hr.) | Range | | | | | | |
| Not treated | | | 450 | 9.3 | 900 | 86 | 4.9 | |
| 120 | 20 | Outside | 450 | 9.3 | 900 | 86 | 4.9 | Nil. |
| 140 | 0.3 | do | 450 | 9.3 | 900 | 86 | 4.9 | Nil. |
| 140 | 1.0 | A | 440 | 13 | 1,000 | 90 | 6.4 | Nil. |
| 140 | 4 | A | 436 | 14 | 1,040 | 89 | 6.6 | Nil. |
| 140 | 9 | B | 430 | 15 | 1,093 | 88 | 7.0 | Nil. |
| 140 | 15 | Outside | 429 | 15 | 1,100 | 88 | 7.0 | Nil. |
| 160 | 0.2 | do | 450 | 9.3 | 900 | 86 | 4.9 | Nil. |
| 160 | 1 | B | 430 | 19 | 1,050 | 85 | 8.0 | Nil. |
| 160 | 4 | C | 424 | 21 | 1,100 | 84 | 8.4 | Nil. |
| 160 | 9 | B | 420 | 25 | 1,155 | 84 | 8.7 | Present. |
| 160 | 15 | Outside | 400 | 20 | 1,105 | 80 | 8.0 | Do. |
| 180 | 0.1 | do | 450 | 9.3 | 900 | 86 | 4.9 | Nil. |
| 180 | 1 | C | 420 | 26 | 1,050 | 82 | 9.5 | Nil. |
| 180 | 4 | C | 411 | 29 | 1,105 | 81 | 9.8 | Nil. |
| 180 | 9 | B | 405 | 35 | 1,154 | 80 | 10.0 | Present. |
| 180 | 15 | Outside | 397 | 27 | 1,069 | 78 | 8.9 | Do. |
| 200 | 0.1 | do | 450 | 9.3 | 900 | 86 | 4.9 | Nil. |
| 200 | 1 | C | 400 | 55 | 1,080 | 80 | 10.9 | Nil. |
| 200 | 4 | B | 390 | 57 | 1,089 | 77 | 11.0 | Present. |
| 200 | 9 | A | 381 | 57 | 1,095 | 75 | 11.1 | Do. |
| 200 | 15 | Outside | 363 | 50 | 1,051 | 71 | 10.5 | Do. |
| 220 | 0.05 | do | 450 | 9.3 | 900 | 86 | 4.9 | Nil. |
| 220 | 1 | A | 380 | 48 | 1,030 | 78 | 10.1 | Present. |
| 220 | 4 | A | 373 | 39 | 960 | 77 | 8.9 | Do. |
| 220 | 9 | Outside | 358 | 25 | 900 | 69 | 8.0 | Do. |
| 230 | 0.01 | do | 450 | 9.3 | 900 | 86 | 4.9 | Nil. |
| 230 | 0.05 | A | 450 | 10 | 910 | 84 | 5.1 | Present. |
| 230 | 1 | Outside | 360 | 20 | 950 | 74 | 7.0 | Do. |

In table 6, the values of the test pieces Nos. 2, 3, 4 and 13 represent those which have undergone heat treatment under conditions outside the ranges defined by the present invention. From table 6, , it will be understood that the toughness, the imparting of which is the object of the present invention, is marked improved by subjecting molded articles of polypivalolactone resin to a heat treatment.

EXAMPLE 4

Using a polypivalolactone resin of $[\eta]=2.8$, test pieces of molded plastic articles were prepared under the same molding conditions as those in example 3. After subjecting them to a heat treatment, their impact fatigue resistances were measured. This measurement was performed by first mechanically forming a V-shape notch of 0.1 inch in depth in each test piece, and then giving impact to this test piece by dropping a weight of 246 gr. onto the test piece secured to a support at one end thereof from a height of 7 cm. measuring thereabove, by the use of an impact fatigue tester manufactured by K. K. Ueshima Seisakusho. The result of this test which was evaluated by the number of droppings of the weight till the tests piece was broken is shown in table 7.

As a reference, the result of similar tests conducted on control test pieces consisting of molded ABS (MV) resin similar in properties to polypivalolactone resin is given in this table.

TABLE 7

Relations between heat treatment conditions and fatigue resistance of the molded plastic articles

| Heat treatment conditions | | Impact fatigue resistance |
|---|---|---|
| Temp. (°C.) | Duration (hr.) | (Number of dropping) |
| Not heat-treated | | 1 |
| 100 | 10 | 1 |
| 130 | 0.05 | 1 |
| 130 | 0.5 | 5 |
| 150 | 1 | 143 |
| inch | 7 | 152 |
| 160 | a | 163 |
| 160 | 7 | 170 |
| 200 | 1 | 65 |
| 200 | 7 | 72 |
| 220 | 1 | 50 |
| 220 | 7 | 41 |
| 230 | 0.03 | 1 |
| 230 | 0.05 | 5 |
| 230 | 1 | 2 |
| ABS(MW) | | 18 |

By subjecting the molded plastic articles to a heat treatment under the heat treatment conditions defined according to the present invention, the impact fatigue resistance was markedly improved and the resulting molded plastic articles could thus be used as materials useful for industrial purposes.

EXAMPLE 5

An important aspect of the operation which requires caution is the prevention of the occurrence of coloring in the molded plastic articles. Caution should be exercised when the heat treatment is performed in accordance with dry heat treatment and when this treatment is carried out at a high temperature or for many hours. In this example, the problem of coloring of the molded articles of polypivalolactone resin which are subjected to dry heat treatment is taken up, and the limits of both the temperature and the duration of the heat treatment till coloring occurred were sought. The result is shown in table 8.

The test pieces used in this example has an $[\eta]$ of 303, and were prepared under the molding conditions consisting of a cylinder temperature of 250° C., an injection pressure of 800 kg./cm.², a metal mold temperature of 120° C. and a cycle of 1 minute for dumbbell type test pieces and 2 minutes for square-bar-type test pieces.

TABLE 8

Relations between heat treatment conditions and coloring

| Heat treatment conditions | | Coloring |
|---|---|---|
| Temp. (°C.) | Duration (hr.) | |
| 100 | 20 | None |
| 150 | 10 | Present |
| 150 | 5 | None |
| 180 | 4 | None |
| 180 | 5 | Present |
| 180 | 10 | Present (marked) |
| 200 | 1 | None |
| 200 | 2 | Present |
| 200 | 10 | Present (marked) |
| 220 | 0.05 | Present |
| 220 | 1 | Present (marked) |

From the result of table 8, it is known that the heat treatment conditions according to the present invention which satisfy the aforesaid equation (10) do not give rise to coloring of the molded plastic articles.

In practice, however, molded plastic articles usually do not consist of a single component of polypivalolactone resin alone. It is usual that these molded plastic articles contain stabilizers, pigments and/or other additives which are used to meet the purposes for which the molded plastic articles are used. Therefore, it is possible that the limitation which is given by said equation deviates to some extent without any actual harm on the molded plastic articles. Such a slight deviation can be exercised as desired so as to meet the purpose for which the molded plastic articles are used.

EXAMPLE 6

This example is intended to elucidate the relations of heat treatment conditions to hardness, bending strength and compressive strength. Using a polypivalolactone resin $[\eta]=2.7$, molding was performed in a manner similar to that described in example 3. Heat treatment was conducted under the heat treatment conditions as shown in table 9.

TABLE 9

| Test piece No. | Conditions of heat treatment | |
|---|---|---|
| | Heat treatment temperature (°C.) | Duration of heat treatment (hr.) |
| 1 | 100 | 0.05 |
| 2 | 100 | 10 |
| 3 | 130 | 0.05 |
| 4 | 130 | 0.5 |
| 5 | 130 | 1 |
| 6 | 150 | 1 |
| 7 | 150 | 7 |
| 8 | 200 | 1 |
| 9 | 200 | 7 |
| 10 | 220 | 1 |
| 11 | 220 | 7 |
| 12 | 230 | 0.03 |
| 13 | 230 | 0.05 |
| 14 | 230 | 1 |

The properties of the molded plastic articles which have been given a heat treatment is shown in table 10.

From table 10, it will be understood that other than a slight increase in the bending and compressive strengths which is resulted from the heat treatment performed under the preferred heat treatment conditions, there is noted no substantial effect of the heat treatment as a whole.

TABLE 10

| Test piece number | Hardness (Rockwell M) | Bending strength (kg./cm.²) | Compressive strength (kg./cm.²) |
|---|---|---|---|
| Not heat-treated | 86 | 480 | 910 |
| 1 | 86 | 480 | 910 |
| 2 | 87 | 590 | 900 |
| 3 | 86 | 480 | 910 |
| 4 | 88 | 520 | 950 |
| 5 | 90 | 620 | 1000 |
| 6 | 87 | 560 | 1000 |
| 7 | 89 | 530 | 1120 |
| 8 | 86 | 530 | 1000 |
| 9 | 78 | 500 | 1100 |
| 10 | 72 | 520 | 1000 |
| 11 | 67 | 500 | 900 |
| 12 | 84 | 480 | 900 |
| 13 | 70 | 490 | 870 |
| 14 | 65 | 490 | 800 |

EXAMPLE 7

In molding a polypivalolactone resin, there naturally a range of intrinsic viscosity $[\eta]$ which is appropriate for the molding.

The appropriate range of grades of the intrinsic viscosity of polypivalolactone resin has been described in the earlier part of this specification. In the present example, however, test pieces having intrinsic viscosity $[\eta]$ of 1.1, 2.9 and 4.8, respectively, were used. The result of the observations of the molding of these test pieces under various molding conditions and of the subsequent heat treatment given these molded test pieces will be hereunder described.

First, the molding conditions and the evaluation of the external appearances of the molded plastic articles are shown in table 11.

described. It was found as the result of the experiment conducted by us, that in both the blow molding and the extrusion molding, the adoption of polypivalolactone resins having a higher intrinsic viscosity $[\eta]$ brought forth satisfactory results in general, and that in the injection molding and the compression molding, the adoption of polypivaloactone resins having a lower intrinsic viscosity $[\eta]$ gave satisfactory results.

With respect to the result of the heat treatment, those plastic articles which have been molded under satisfactory molding conditions acquire a highly increased toughness due to the heat treatment given, as has been already described in this specification.

EXAMPLE 8

A polypivalolactone resin having an $[\eta]$ of 3.6 and mixed with 0.1 percent by weight of trioctadecyl phosphite and 0.5 percent by weight of dilauryl thiodipropionate was used. This mixture was subjected to compression molding by the use of an oil pressure-heat press manufactured by K. K. Shindo Kinzoku Kogyosho. By cooling this initial molded plastic article while being compressed in the cold press, a sheet-form molded plastic article having a thickness of 3 mm. was obtained.

The molding conditions employed in this compression molding consisted of the temperature of 260° C. and the pressure of 200 kg./cm.². The resulting molded plastic article was given a steam heat treatment at 180° C. for 1 hour. Dumbbell TABLE 11.—MOLDING CONDITIONS AND MOLDED PLASTIC ARTICLES HAVING VARIOUS VALUES OF $(\eta)$

| Cylinder temp. (° C.) | Injection pressure (kg./cm.²) | Metal mold temp. (° C.) | $(\eta)$ 1.1 | 2.9 | 4.8 |
|---|---|---|---|---|---|
| 245 | 400 | 150 | | Lack of filling | |
| 245 | 1,100 | 150 | | Poorly molded | |
| 250 | 200 | 150 | | Lack of filling | |
| 250 | 400 | 150 | Satisfactory | | Lack of filling |
| 250 | 600 | 150 | do | Satisfactory | Lack of filling. |
| 250 | 800 | 150 | do | do | Do. |
| 270 | 200 | 150 | | Lack of filling | |
| 270 | 400 | 150 | Satisfactory | | Lack of filling |
| 270 | 600 | 150 | do | Satisfactory | Lack of filling. |
| 270 | 800 | 150 | do | do | Do. |
| 270 | 1,000 | 150 | Cracks | do | Do. |
| 290 | 600 | 150 | do | do | Do. |
| 290 | 1,000 | 150 | do | do | Do. |
| 310 | 600 | 150 | Cracks and colored | Colored | Cracks and colored. |
| 310 | 1,000 | 150 | do | do | Do. |

In table 11, the properties of those satisfactorily molded plastic articles which have been given a heat treatment at 200° C. for 1 hour are shown in table 12.

type test pieces were obtained by punching this sheet, and they were evaluated as regards their properties. The result of this evaluation is shown in table 13.

TABLE 12.—MOLDING CONDITIONS AND PROPERTIES OF MOLDED PLASTIC ARTICLES HAVING UNDERGONE HEAT TREATMENT

| | Cylinder temp. (° C.) | Injection pressure (kg./cm.²) | Metal mold temp. (° C.) | Tensile strength (kg./cm.²) | Elongation (percent) | Compressive strength (kg./cm.²) | Hardness (Rockwell M) | Impact resistance (kg. cm./cm.²) | Bending strength (kg./cm.²) |
|---|---|---|---|---|---|---|---|---|---|
| 1.1 | 250 | 400 | 150 | 350 | 46 | 880 | 76 | 9.0 | 480 |
| | 250 | 800 | 150 | 370 | 45 | 900 | 77 | 9.3 | 490 |
| | 270 | 400 | 150 | 360 | 47 | 800 | 76 | 9.0 | 485 |
| | 270 | 800 | 150 | 370 | 50 | 890 | 78 | 9.2 | 490 |
| 2.9 | 250 | 600 | 150 | 410 | 60 | 970 | 80 | 10.8 | 520 |
| | 250 | 800 | 150 | 430 | 58 | 1,000 | 84 | 11.1 | 530 |
| | 270 | 600 | 150 | 430 | 60 | 1,000 | 82 | 10.0 | 530 |
| | 270 | 1,000 | 150 | 450 | 59 | 1,050 | 84 | 11.1 | 540 |
| | 290 | 600 | 150 | 430 | 52 | 950 | 82 | 9.8 | 520 |
| | 290 | 1,000 | 150 | 450 | 55 | 950 | 83 | 10.5 | 530 |

In the injection molding, its molding workability is such that the appropriate range of $[\eta]$ which has been described in the earlier part of this specification varies somewhat depending on the shape and the size of the gate, sprue and runner of the metal mold used. However, satisfactory molded plastic articles are manufactured so long as the injection molding is performed by the use of a polypivalolactone resin having an intrinsic viscosity $[\eta]$ in the range as described in the earlier part of this specification and under the molding conditions herein

TABLE 13

| Tensile strength (kg./cm.²) | Elongation (%) | Hardness (Rockwell M) | Impact resistance (kg.cm./cm.²) |
|---|---|---|---|
| 450 | 58 | 88 | 45 |

The impact resistance shown in the above table 13 was measured on those test pieces of 127×12.7×3 (mm.) in size which were punched from said sheet for the exclusive use in this example.

EXAMPLE 9

A polypivalolactone resin of $[\eta]=2.9$ and containing 0.17 percent by weight of titanium dioxide as the delustering agent was used. The mixture was subjected to molding under the molding conditions consisting of the cylinder temperature of 250° C., the injection pressure of 1000 kg./cm.², the metal mold temperature of 180° C. and the cycle of 1 minute for dumbbell type test piece and 2 minutes for square-bar-type test pieces. The molded test pieces were then subjected to a heat treatment at 200° C. for 1 hour. The result of the evaluation of the properties of these test pieces is shown in table 14.

TABLE 14.—PROPERTIES OF MOLDED PLASTIC ARTICLES HAVING UNDERGONE HEAT TREATMENT

| Tensile strength (kg./cm.²) | Elongation (percent) | Compressive strength (kg./cm.²) | Hardness (Rockwell M) | Impact resistance (kg.cm./cm.²) | Bending strength (kg./cm.²) |
| --- | --- | --- | --- | --- | --- |
| 460 | 62 | 1150 | 85 | 15 | 540 |

EXAMPLE 10

Using a polypivalolactone resin of $[\eta]=2.95$, discs of 40Φ×4 (mm.) were molded according to the compression molding techniques under the molding conditions consisting of the molding temperature of 260° C. and the pressure of 33 kg./cm.² which was employed in compressing the polymer. The molded plastic discs were then subjected to heat treatment at 195° C. for 1 hour.

The result of the evaluation of the properties of the molded plastic articles thus obtained is shown in table 15.

TABLE 15.—PROPERTIES OF MOLDED PLASTIC ARTICLES MANUFACTURED ACCORDING TO COMPRESSION MOLDING TECHNIQUES

| | Tensile strength (kg./cm.²) | Elongation (percent) | Hardness (Rockwell M) | Impact resistance (of Izod notch) (kg. cm./cm.²) |
| --- | --- | --- | --- | --- |
| Not heat-treated | 204 | 3.5 | 86 | 22.1 |
| Heat-treated | 195 | 18.6 | 83 | 31.3 |

In table 15, the impact resistance was measured with a UF Impact Tester manufactured by K. K. Ueshima Seisakusho, on test pieces of 40×10×4 (mm.) in size and having no notches which were prepared by processing said discs.

The hardness was measured, with a Rockwell hardness tester (type ARK–A) manufactured by K. K. Ueshima Seisakusho, on the aforesaid test pieces.

The tensile strength and elongation were measured on films of 0.2 mm. in thickness which were prepared from said discs, and by the use of a Tensilon manufactured by Toyo Sokki K. K., before and after the molded plastic articles were given a heat treatment.

As is clear from table 15, a marked effect of heat treatment is seen also in the molded plastic articles which are manufactured according to the compression molding techniques, and there is no loss, due to the heat treatment applied of the desirable properties such as rigidity and tensile strength of the polypivalolactone resin used.

EXAMPLE 11

Using a polypivalolactone resin of $[\eta]=4.0$, and using an extruder of 40 mm. this polymer was supplied, via a hopper which was held at 240° C., to a cylinder which was held at 275° C., and therefrom the polymer was extruded, in sheet-form, from an open die. Thus, a sheet having a thickness of 10 mm. was manufactured. The sheet thus produced was then subjected to a heat treatment at 185° C. for 2 hours.

The result of the evaluation of the properties of the molded plastic articles is shown in table 16.

As is clear from table 16, satisfactory effect is afforded by the heat treatment. It is noted that a marked increase in toughness is imparted to the molded plastic articles without impairing the desirable properties of the polypivalolactone resin used.

TABLE 16

| Properties of the molded plastic articles manufactured according to the extrusion molding techniques | | | |
| --- | --- | --- | --- |
| | Compressive strength (kg./cm.²) | Hardness (Rockwell.M) | Impact resistance (of Izod notch) (kg.cm./cm.²) |
| Not heat-treated | 1045 | 86 | 5.1 |
| Heat-treated | 1193 | 83 | 16.3 |

EXAMPLE 12

Plastic bottles of about 0.4 liter in capacity and having a small wall thickness were molded with a polypivalolactone resin of $[\eta]=4.0$. Extrusion of this polymer was performed by the use of an extruder having 20 mm. diameter of screw and under the molding conditions consisting of a cylinder temperature in which the temperature on the hopper side was regulated to 230° C., and further consisting of the die temperature of 250° C., the metal mold temperature of 150° C. and the number of rotation of the screw of 35 r.p.m. The air pressure which was employed in expanding the parison was about 3.3 kg./cm.². A dropping test from the height of 75 cm. was conducted on the bottles thus produced.

More specifically, when those molded plastic bottles of 400 cc. which were not heat-treated and which were filled with water were dropped from said height, the bottles were broken on one drop test.

In contrast to this, those molded plastic bottles having been given a heat treatment at 190° C. for 1 hour were broken for the first time on the 67th dropping test. Thus, a marked increase in toughness due to the heat treatment is noted also in molded plastic articles which are manufactured according to the blow molding techniques.

What is claimed is:

1. A method of manufacturing nonfiber-form extruded articles of polypivalolactone resin, which articles having highly increased rigidity and toughness, comprising the steps of extruding polypivalolactone resin having an intrinsic viscosity $[\eta]$ in the range of from 1.5 to 4.0 to produce nonfibrous extruded articles, wherein the temperature of the hopper section of the extruder is in the range of 220°–250° C., the temperature of the extruder cylinder is in the range of 260°–280° C., the temperature of the extruder adapter is in the range of 260°–280° C. and the temperature of the extruder die is in the range of 250°–270° C., and then subjecting the extruder articles to a heat treatment, by applying thereto a fluid heating medium which does not react with polypivalolactone resin, the heat treatment being carried out under treatment conditions consisting of temperature and duration which fall within the hatched area of FIG. 1, said hatched area being defined by the equations:

$$y \leq -0.45x+103.4$$
$$y \geq -1.9x+247.5$$
$$y \geq -0.0045x+1.1$$
$$y \leq -0.012x+11.5$$

wherein:

$x$ represents temperature (° C.), and $y$ represents duration (hr.).

2. A method according to claim 1, in which the treatment conditions fall within the hatched are of FIG. 2, said hatched area being defined by the equations:

$$y \; -0.0045x+1.1$$
$$y \; -0.012x+11.5$$
$$y \; 0.01x^2-4.42x+488.4$$
$$y \; 0.003x^2-1.14x+105.9$$

wherein:

$x$ represents temperature (°C.), and
$y$ represents duration (hr.).

3. A method according to claim 1, in which the treatment conditions fall within the hatched area of FIG. 3, said hatched area being defined by the equations:

$$y \leq -0.033x+11$$
$$y \geq -0.017x+3.83$$
$$y \leq 0.002x^2-0.92x+105.3$$
$$y \geq 0.003x^2-1.2x+119.1$$

wherein:

$x$ represents temperature (°C.), and
$y$ represents duration (hr.).

4. A method according to claim 1, wherein said polypivalolactone resin has an intrinsic viscosity $[\eta]$ in the range of from 2.60 to 4.0.

5. A method according to claim 1, wherein said heat treatment medium is an inactive medium selected from the group consisting of heated air, hot water, heated aqueous vapor, Wood's alloys and heated oil materials.

6. A method according to claim 1, wherein said polypivalolactone resin contains a small amount of stabilizer.

7. a method according to claim 6, wherein said stabilizer is a substance selected from the group consisting of trioctadecyl phosphite and dilauryl thiodipropionate.

8. A method according to claim 1, wherein said polypivalolactone resin contains a small amount of titanium dioxide.

9. A method according to claim 1, wherein said molded plastic articles consist of a copolymer of polypivalolactone monomer and 25 mol percent of another lactone.

10. A method of claim 9, wherein said other lactone is one selected from the group consisting of $\beta$-propiolactone and $\alpha,\alpha$-diethylpropiolactone.

UNITED STATES PATENT OFFICE
CERTIFICATE OF CORRECTION

Patent No. 3,626,048          Dated December 7, 1971

Inventor(s) Tohru Kitazawa and Masao Onga

It is certified that error appears in the above-identified patent and that said Letters Patent are hereby corrected as shown below:

Column 20, line 54; "having" is corrected to read ---have---.

line 63; "extruder" is corrected to read ---extruded---.

Column 21, lines 5-9; These lines are corrected to read
$$y_> -0.0045x + 1.1$$
$$y_< -0.012x + 11.5$$
$$y_< 0.01x^2 - 4.42x + 488.4$$
$$y_\geq 0.003x^2 - 1.14x + 105.9$$
---.

Column 22, line 7; "oil" is corrected to read---oily---.

line 20; "of" is corrected to read ---according to---.

Signed and sealed this 6th day of June 1972.

(SEAL)
Attest:

EDWARD M. FLETCHER, JR.
Attesting Officer

ROBERT GOTTSCHALK
Commissioner of Patents